United States Patent [19]
Challener et al.

[11] Patent Number: 5,973,666
[45] Date of Patent: Oct. 26, 1999

[54] METHOD AND MEANS FOR CONTROLLING THE CONCURRENT EXECUTION OF A PLURALITY OF PROGRAMS ON A COMPUTER SYSTEM

[75] Inventors: David Carroll Challener, Raleigh, N.C.; Calvin Bruce Swart, Poughkeepsie; Stephen Earle Fischer, Wappingers Falls, both of N.Y.; William Brian Cunningham, Bolton, United Kingdom

[73] Assignee: International Business Machines Corporation, Armonk, N.Y.

[21] Appl. No.: 08/504,726

[22] Filed: Jul. 20, 1995

[51] Int. Cl.$^6$ ...................................................... G09G 5/00
[52] U.S. Cl. .......................................... 345/146; 345/184
[58] Field of Search ..................................... 345/156, 157, 345/124, 146, 168, 184; 341/20; 395/885, 887, 893, 800; 318/560

[56] References Cited

U.S. PATENT DOCUMENTS

| | | | |
|---|---|---|---|
| 4,763,117 | 8/1988 | Blattner et al. | 345/146 |
| 4,918,293 | 4/1990 | McGeorge | 345/184 |
| 4,964,075 | 10/1990 | Shaver et al. | 395/887 |
| 5,214,785 | 5/1993 | Fairweather | 395/800 |
| 5,270,689 | 12/1993 | Hermann | 345/157 |
| 5,363,481 | 11/1994 | Tilt | 345/124 |
| 5,438,331 | 8/1995 | Gilligan et al. | 341/30 |
| 5,440,325 | 8/1995 | Edmark, III | 345/184 |
| 5,481,169 | 1/1996 | Turetta et al. | 318/560 |
| 5,546,106 | 8/1996 | Walgers | 345/157 |

OTHER PUBLICATIONS

Mastering Windows™ 3.1, Sybex, pp. 51–53, 1993.

*Primary Examiner*—Steven Saras
*Attorney, Agent, or Firm*—Richard A. Tomlin; Ronald V. Davidge

[57] ABSTRACT

A television style channel (program) changer switch is electrically coupled to the central processing unit of a computer system. A user defined lookup table assigns switch positions to programs available for execution in the system. Program controlled means initiates execution of each program and switches between programs in accordance with the positioning of the switch by a system user.

20 Claims, 4 Drawing Sheets

METHOD AND MEANS FOR CONTROLLING THE CONCURRENT EXECUTION OF A PLURALITY OF PROGRAMS ON A COMPUTER SYSTEM

BACKGROUND OF THE INVENTION

1. Field of the Invention

The present invention relates to a more simplified, intuitive method and means for selecting programs for execution in a computer system. More particularly, the invention in one aspect is intended to permit less sophisticated users of personal computers (PCs) an easier, less intimidating mechanism for selecting between programs for execution in a multi-tasking environment.

2. Description of the Prior Art

Many attempts have been made over the years, particularly in the personal computer marketplace, to simplify the use of computers. For example, computer programs called graphical user interfaces such as WINDOWS (Trademark of Microsoft Corporation) have been introduced to make the use of the computer easier. Instead of getting things done by typing in cryptic keyboard commands, the user merely "points" a mouse to an object on the computer screen and "clicks" the mouse button.

In one typical WINDOWS environment, an IBM (Trademark of International Business Machines Corp.) PS1 (TM) is turned on, DOS (disk operating system) will "boot up," a DOS prompt appears on the monitor screen, "WIN" is typed and enter key is pressed to load WINDOWS into the computer memory and a Program Manager screen or "window" with icons identifying available applications appears on the monitor screen.

By pointing to and clicking the mouse on an available program icon shown on the Program Manager window, a first program corresponding to the icon is started and is said to be "running." A window of the first program is superimposed on the Program Manager window. By subsequently clicking on part of the Program Manager "window" and other icons several programs can be started and begin running, each having a window superimposed upon the window of the previously started program. The program having its window on "top" of all the others will be identified herein as the "active" program (or "active and running" program since it is obviously running) and as having "focus."

Although this arrangement has been introduced to simplify use of a personal computer, it is still intimidating and difficult to use to many beginning users and problems still exist for beginners when several programs are running concurrently. For example, the need to make the active program window as large as possible (preferably full screen) makes it difficult for beginners to find and access the Program Manager Screen to switch to another task. Also various "folders" must be opened and closed. What is needed is a natural interface to make the PC easier, more intuitive to use so that a new user can quickly become productive.

Accordingly, it is an object of the present invention to provide an even more simplified method and means for initiating the operation of a computer, to start programs running and to switch between programs. The present invention is particularly useful to beginning users of personal computers and is a significant time saver for even sophisticated users.

Two major customer groups for which the present invention will be particularly helpful are members of the American Association of Retired persons, many of whom have not had extensive experience with personal computers, and office and retail store personnel who use only a few applications in their work.

SUMMARY OF THE INVENTION

A television type channel changer switch and appropriate software are added to a PC to enable users to intuitively start and switch between application programs.

In accordance with a preferred embodiment of the invention, a conventional personal computer operating with DOS operating system and a WINDOWS graphical user interface is provided with a manually operable multi-position switch which is programmable. An initialization (INI) file contains a lookup table i.e. a list of at least certain programs available for execution on the computer. The list is customizable by the user and software assigns each program in the list to a respective one of the switch positions. In a preferred embodiment, the switch comprises an old TV style channel (program) changer switch although alternative well known means may be used such as a remote control TV channel changer or push button switches such as those used in some radios which permit only one switch to be activated at a time.

When a user wishes to run a desired program, he merely sets the switch to the position corresponding to the program and turns the computer on. Software initializes the system, loading DOS and WINDOWS into main store, loads the lookup table and starts a SWITCH program which will start the desired program, bringing it to the "top" and giving it focus (i.e. makes it the "active" program). The desired program is now ready for use by the user.

If the user desires to use several of the programs in a multi-tasking WINDOWS environment, he merely moves the switch sequentially to each position corresponding to one of the desired programs. SWITCH software starts running each of the programs as the switch is moved to each corresponding position. The last (i.e. "current") position of the switch determines which of the running programs is the active program having focus.

Switching between each of the running programs merely requires moving the switch to a position corresponding to the desired program.

In the preferred embodiment, the television channel changer switch is a binary coded decimal switch with four output lines which are software readable and coupled to the PC central processing unit (CPU) via an I/O bus and I/O adapter.

In the preferred embodiment, SWITCH software is provided which starts upon starting Windows (assuming Windows is in the start up group). The SWITCH software reads an initialization (INI) file, which contains the list of application programs (and other programs if desired) and their switch positions. The SWITCH software checks the current switch position and determines which application should be running; it starts the application and switches to it (i.e. makes it the active program). This software of the preferred embodiment checks (for example, twice a second) the position of the switch; and if the position has changed, the software switches to a running application or starts and switches to a non-running application corresponding to the changed position.

In accordance with these and other objects which will become apparent hereinafter, the instant invention will now be described with particular reference to the accompanying drawings.

DESCRIPTION OF THE PREFERRED EMBODIMENTS

Figure 1:
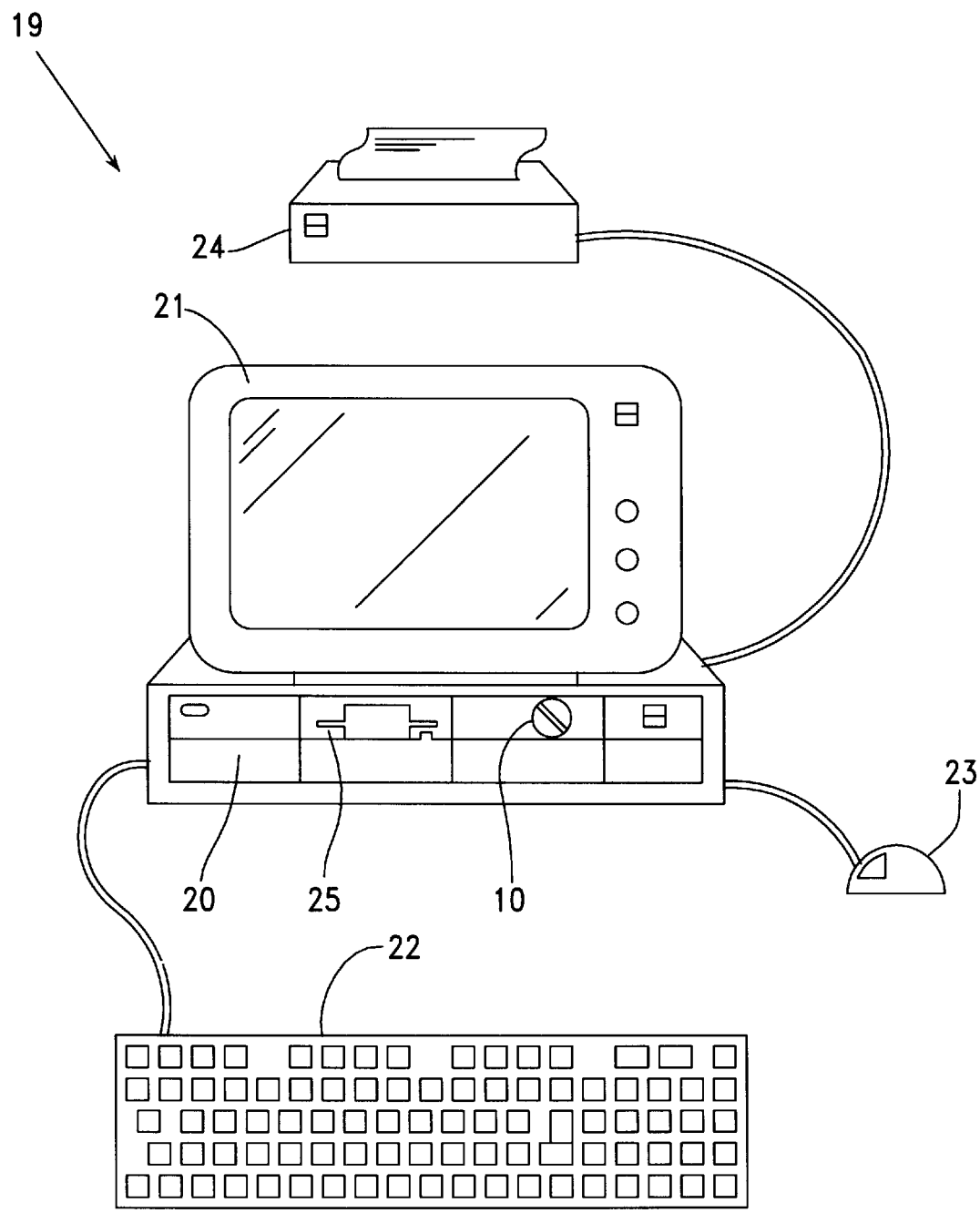
FIG. 1 is a graphical representation of the computer system of the present invention.

FIG. 1 is a simplified illustration of a personal computer system 19 with which the present invention is preferably used. It includes a system unit 20, a keyboard input device 22, a monitor 21, a mouse input device 23, a printer output device 24 and a disk 25.

Figure 2:
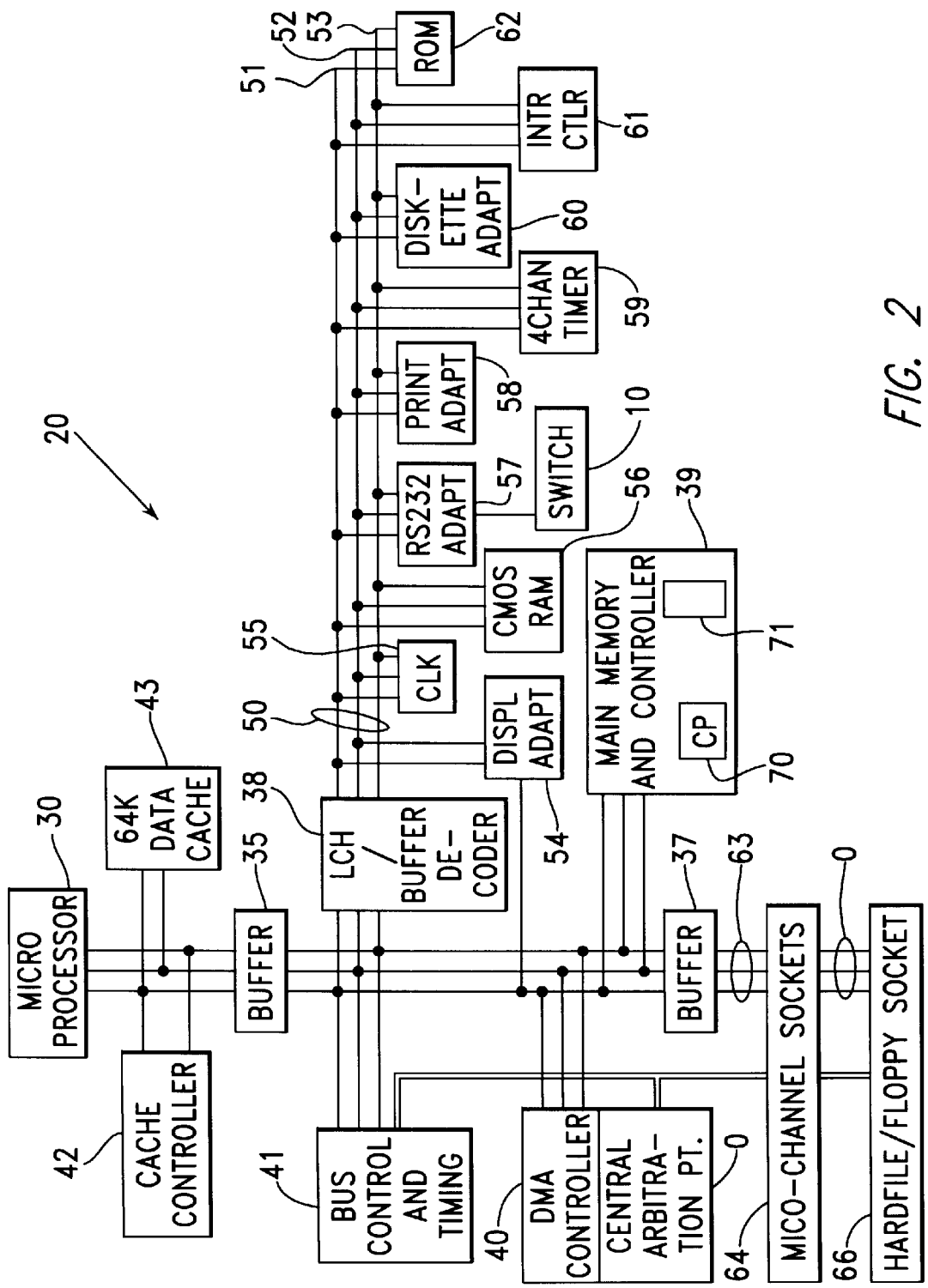
FIG. 2 is a block diagram of one form that the system unit of the computer system of the present invention may take.

FIG. 2 is a block diagram of one form of the computer system unit 20, for example an IBM Personal System 2. (IBM and Personal System 2 are trademarks of International Business Machines Corporation). The computer system unit 20 is shown and described more fully in U.S. Pat. No. 5,034,917 issued Jul. 23, 1991 to Bland, et al. The computer system unit 20 will be described only briefly so as to illustrate a preferred means of coupling the programmable TV style switch 10 of the present invention to the system unit 20 and to indicate alternative coupling means.

Thus the system unit 20 includes a central processing unit (CPU) 30 having a CPU local bus 31 coupled between the CPU 30 and a buffer 35. A system local bus 36 is coupled between the buffer 35 and a buffer 37, a buffer/decoder 38, a main memory/controller 39, a direct memory access (DMA), controller 40 and a bus control and timing circuit 41.

A cache controller 42 controls the storage and access of frequently used data which is stored in a data cache 43 to effectively speed up operation of the system unit 20.

The system local bus 36 is coupled via the latch buffer/decoder 38 to an input/output (I/O) bus 50 having an address bus 51, data bus 52 and control bus 53. The I/O bus 50 is coupled to a display adapter 54, a clock 55, a CMOS RAM 56, an RS232 adapter 57, a print adapter 58, a four channel timer 59, a diskette adapter 60, an interrupt controller 61, a read only memory (ROM) 62 which contains the system Basic Input Output System (BIOS).

A Micro Channel (TM) bus 63 and associated elements 64, 65 permit the addition of numerous feature cards for memory and video, direct access storage device (DASD) and communications adapters as described in the IBM PS/2 Model 80 Technical Reference Manual.

In the preferred embodiment, the manually operable programmable switch 10 of the present invention is mounted at suitable position on the front side of the system unit 20 as shown in FIG. 1.

Figure 3:
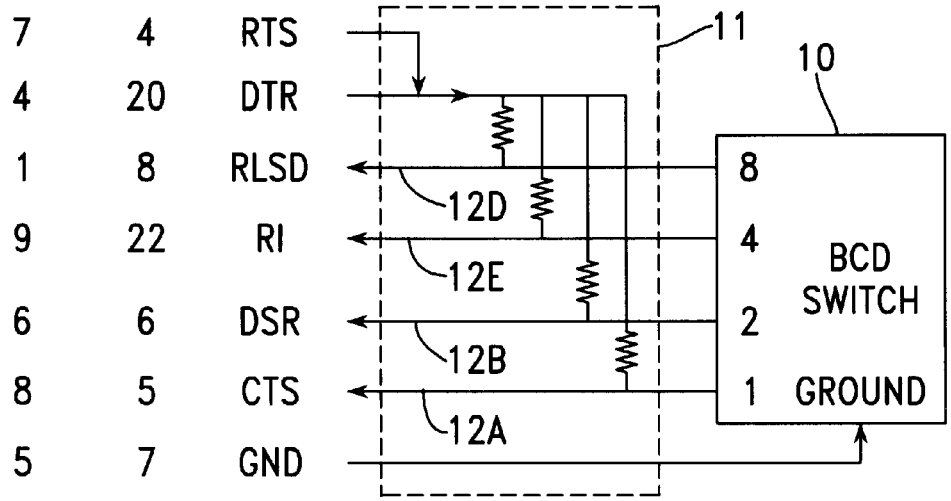
FIG. 3 is a partial schematic diagram illustrating a preferred form of the program selecting switch and interface circuits for coupling the switch to the computer system of FIG. 2.

Electrical interface circuits 11 (FIG. 3) couple the switch 10 to a standard RS 232 adapter 57 (FIG. 2) having either a nine pin or 25 pin configuration. It is assumed that ground potential = inactive and a positive potential = active on output lines 12a–12d of the circuits 11 to provide a binary coded decimal (BCD) switch arrangement.

The CPU 30 under SWITCH software control accesses the switch 10 in a well known manner via buffer 35, the latch/buffer/decoder 38, I/O bus 50, the RS 232 adapter 57 and interface circuits 11 when the software wishes to read and determine the current position. When the current position of the switch is read and determined from time to time, the CPU 30 under program control compares the current position with the position previously stored in storage area 70 and takes appropriate action. The new position value is then stored by the CPU 30 into storage area 70. In this manner, the SWITCH software monitors the switch position and then takes appropriate action.

It will be appreciated by those skilled in the art that the switch 10 may be mounted on one of the other system units and its interface circuits 11 coupled to the adapter of said other system unit, for example the display, printer, keyboard or mouse. In such case, modification of the particular I/O adapter may be required to permit sharing of the adapter with the switch.

Figure 5:
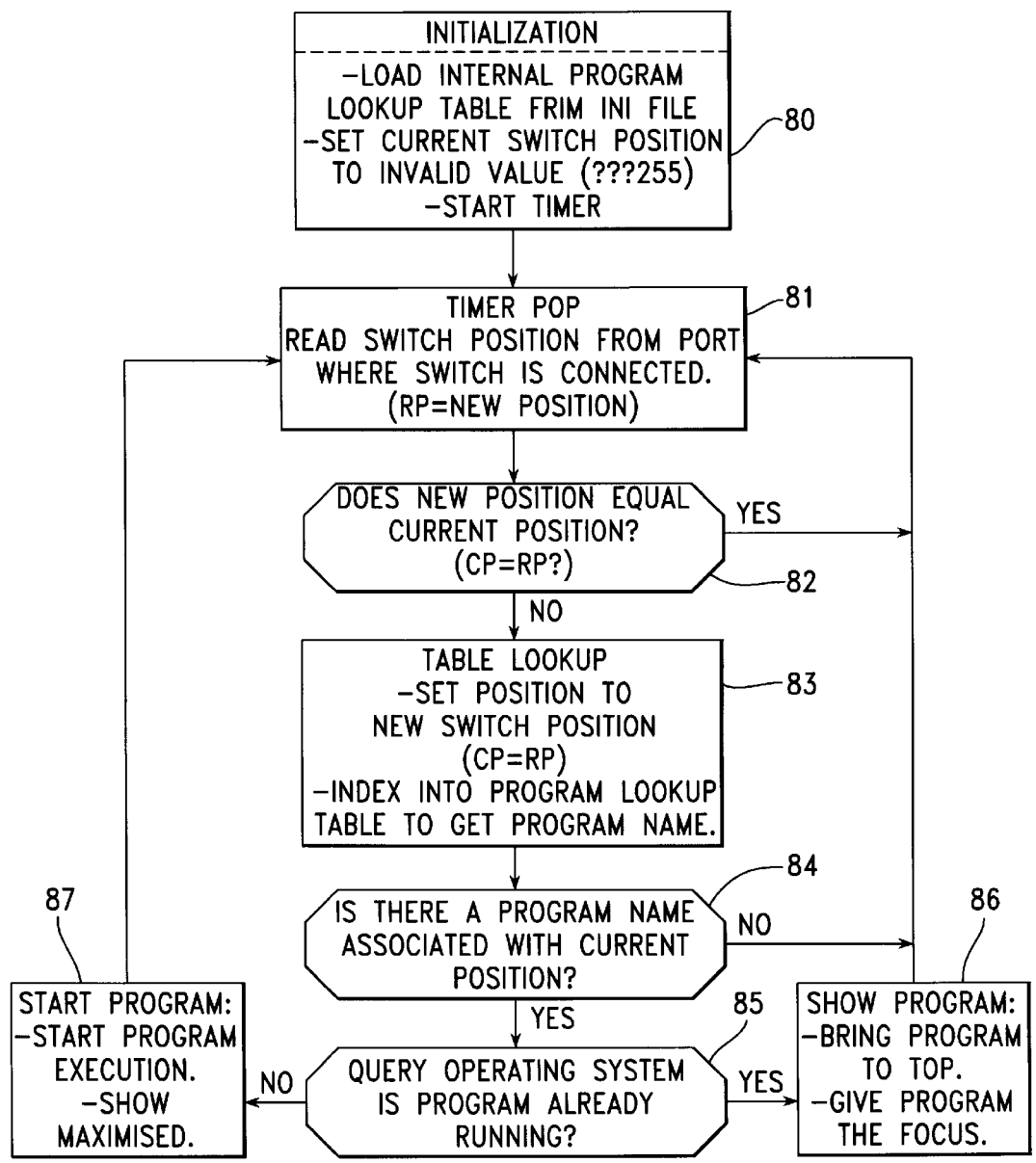
FIG. 5 is a flowchart illustrating a preferred method of selecting programs in the computer system of the present invention.

As is well known in the art, when the system is initialized at start up, various programs and data are moved from the disk 25 (coupled to socket 65) to main memory 39, a part of such programs and data being moved into storage area 71 to customize the switch 10 and to implement the functions shown in the flowchart of FIG. 5.

Figure 4:
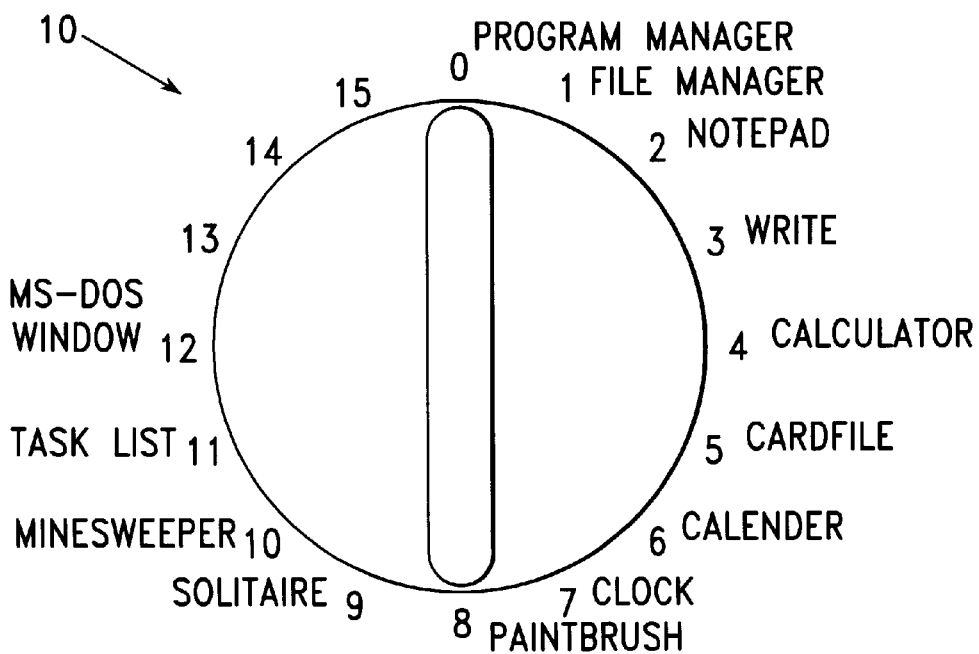
FIG. 4 diagrammatically illustrates a preferred form of the program selecting switch and examples of programs assigned to switch positions 0–12 inclusive.

FIG. 4 illustrates various programs to which switch positions 0–12 inclusive are assigned in the preferred embodiment. In FIG. 4, switch positions 13–15 are not assigned to any programs.

The flowchart of FIG. 5 illustrates a preferred method for using the programmable switch 10 of the present invention. For purposes of illustration, it is assumed that the invention is being used in a Windows multi-tasking environment. The disk 25 stores the SWITCH software which is transferred in a well known manner to the main memory 39 during initialization, the INI file being stored in area 71.

The "INI" file contains a list of programs (look up table) to execute for each of the switch positions 0–12 (FIG. 4. The "INI" file is customizable by the user through editing the file or by program methods such as drag-drop.

Two areas of main memory 39 (FIG. 2) are referred to during a description of the flowchart of FIG. 5. A memory storage area 70 is reserved for storing the current position CP of the switch 10. The storage area 71 is reserved for storing the program look up table and associated software programs.

In the flowchart of FIG. 5, initialization of the computer system 19 is illustrated in block 80. If the user wishes to operate the computer system 19 in a normal manner without using the special features of the programmable switch 10, he positions the switch to one of the unassigned positions 13, 14 or 15. When he thereafter turns the system 19 on, the system initialization occurs in a normal manner for use of the system 19.

However, if he wishes to make us of the new features of the present invention, he positions the switch 10 to a position corresponding to a predetermined program which he wishes to execute, for example, WRITE in position 3.

More specifically, the following detailed scenario occurs when the user decides to perform word processing and sets the switch 10 to WRITE (position 3), then turns on the computer system 19:

The system boots DOS
DOS runs autoexec.bat
Autoexec.bat executes Windows
Windows executes SWITCH.exe (located in the Startup folder)
SWITCH reads in Initialization file, SW.INI
SWITCH checks position, believes it to have changed (always upon first execution)
SWITCH checks with WINDOWS to see if Write is already executing; it is not so SWITCH starts WRITE and then executes it.
SWITCH periodically checks position of switch 10, sees it has not changed and does nothing.
User decides to check his calendar; sets switch 10 to "Calendar" (position 6).
SWITCH checks switch position, sees it has changed.
Checks to see if Calendar is currently running. It is not, so it starts it up.
SWITCH periodically checks switch position, sees it has not changed and does nothing.
User decides to go back to word processor, sets switch 10 to "WRITE" (position 3).
SWITCH checks with WINDOWS to see if WRITE is already executing (it is) and then switches focus to it.

If the user alternatively decides to use the system in a prior art manner, he can set the switch 10 to one of the unassigned positions 13, 14, or 15. As in the above scenario, the system 19 is turned on and boots DOS. DOS runs autoexec.bat, autoexec.bat executes WINDOWS and WINDOWS executes SWITCH.exe. SWITCH reads the Initialization file, checks the switch position and checks with WINDOWS to determine that no program is assigned to the set switch position. The SWITCH.exe window sits on top of a Program Manager window. The user can then change the switch to an assigned position to start a corresponding program or he can open an application folder and begin processing in a prior art manner.

Comparing the first scenario above with prior art brings out the significant simplicity of applicants' invention.

In the first scenario, the user set the switch to WRITE and turned on the system 19. The WRITE application became available for use with no further user action. In addition, he was able to select the desired application "before he turned on the machine"—a significant advantage.

The following is a typical user scenario in the same system without the switch feature installed:

User decides he wants to word process: Turns on machine
   Machine boots DOS
   DOS runs autoexec.bat
   Autoexec.bat executes WINDOWS, bringing up Program Manager
User opens Applications folder
User finds Write icon and double clicks it
   WINDOWS executes Write program
User decides to check his calendar. Minimizes Write program
User closes Applications folder (previously left open)
User opens Utilities folder
User finds Calendar icon and double clicks it
   WINDOWS executes Calendar program
User decides to go back to Write program he does one of the following:
   1) Minimize Calendar, and maximize Write (most likely)
   2) Ctrl-Esc to get list of running programs, and cursor down to Write and hit enter.
   3) Alt-tab till he gets to Write program (power user)
   These three functions are available to the "switch" user as well With the switch feature installed, the system 19 is more "user friendly" and requires far fewer user interventions to process a job.

In addition, as shown in the preferred embodiment of FIG. 5, the window of the active program which has focus can always be maximized to full screen if desired because switching between programs does not require "minimizing" the window of a currently active program to switch to a new program. All that is required is to set the switch 10 to a new position corresponding to the desired program.

In FIG. 5, block 80 shows initialization of the system 19 including loading the lookup table into main storage area 71, setting the current switch position cp to an invalid value 255 and starting the program timer.

As seen in box 81, the timer reads the position of switch 10 twice a second. The CPU 30 compares the new position with the stored current position (block 81). If they are equal, current processing is continued; if they are not equal, the CPU 30 sets the new value in the current position area 70 and the software indexes into the program lookup table to get the program name corresponding to the new switch position (block 83).

The SWITCH software (block 84) determines whether or not a program name is associated with the new current position. If there is no associated program name, current processing continues. If there is an associated program name (block 85) the operating system (DOS/Windows) is queried to determine if the associated program is already running.

If the associated program is already running (block 86), the program is brought to the top (it is made the active program) and is given focus. The user can now work with the program.

If the associated program is not already running (block 87), the program is started and made active and available for use by the user. Preferably, the program window is maximized.

It will be appreciated that numerous variations to the preferred embodiment may be made. For example, in place of a timer for periodically checking the position of the switch 10, a special driver may be provided to look for changes in the switch position and take action to change focus to a running program or start the program if it is not running.

The invention can be used in environments other than WINDOWS, for example, Geoworks, 052 etc. In a DOS environment without WINDOWS, a similar program can be run as a TSR (terminate and stay resident).

In systems having multiple personalities such as PS/1 (TM of International Business Machines Corp.), the switch feature of the present invention can be used to select among the personalities.

The switch 10 can also be used to control features "within" programs and to switch between different operating systems. more than one switch may be provided where convenient.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A method of selecting program functions for execution in a general purpose computer system with a fixed machine language, said method comprising the steps of:

electrically coupling a manually operable multi-position switch to a central processing unit (CPU) of the computer system;

programmably assigning at least certain of the switch positions to respective ones of the program functions wherein said respective ones of the program functions are identified within an initialization file within said computer system, wherein said initialization file can be modified and edited by the user;

operating the CPU to sense a change a change in the position of the switch; and initiating execution of each of said program functions contained within said initialization file when the CPU senses a change to each of said switch positions assigned to a respective program function.

2. The method of claim 1, wherein:

the program functions are application programs which can be executed in a multi-tasking environment in the computer system, when the CPU senses a change to said switch position assigned to one of said application programs when said one of said application programs is already running, said one of said application programs is made an active program and is given focus, and when the CPU senses a change to said switch position assigned to one of said application programs when said one of said application programs is not already running, said one of said application programs is made active and available for use by the user.

3. The method of claim 2, further comprising the steps of:

setting the multi-position switch to a position corresponding to a desired program prior to turning on the computer system;

thereafter turning the computer system on; and under program control initializing the computer system and starting execution of the desired program independent of user intervention.

4. The method of claim 1, wherein the switch is a multi-position rotary switch rotatable among a number of angular positions.

5. The method of claim 4, wherein said switch includes a number of output lines, with a unique digitally-encoded signal being generated on said output lines for each of said angular positions.

6. The method of claim 1, wherein one of the switch positions is assigned to allow selection of said program functions by means separate from the switch.

7. A method of selecting application programs for execution in a general purpose computer system having a multi-tasking environment comprising the steps of:

electrically coupling a manually operable, multi-position switch to a central processing unit of the computer system, said switch having a plurality of positions into which it may be set, at least certain positions of the switch being assigned to respective application programs wherein said respective application programs are identified within an initialization file within said computer system, wherein said initialization file can be modified and edited by the user;

operating the central processing unit to periodically sense the position of the switch;

determining whether or not the sensed switch position is assigned to an application program currently active and running on the central processing unit;

continuing execution of the currently active and running application when the sensed switch position corresponds thereto; and initiating execution of a predetermined program corresponding to the sensed switch position when the sensed switch position corresponds to an application program other than the currently active and running program.

8. The method of claim 7, further comprising the step of:

starting said predetermined program in the event that it is not running when the corresponding switch position is sensed.

9. The method of claim 8, further comprising the steps of:

setting the multi-position switch to a position corresponding to a desired program prior to turning on the computer system;

thereafter turning the computer system on; and under program control initializing the computer system and starting execution of the desired program independent of user intervention.

10. The method of claim 7, wherein the switch is a multi-position rotary switch rotatable among a number of angular positions.

11. The method of claim 10, wherein said switch includes a number of output lines, with a unique digitally-encoded signal being generated on said output lines for each of said angular positions.

12. The method of claim 7, further comprising the step of:

programming the switch positions to correspond to selected programs in accordance with user requirements.

13. The method of claim 7, wherein one of the positions of the switch is assigned to allow selection of said application programs by means separate from the switch.

14. Apparatus for controlling the concurrent execution of a plurality of application programs by a central processing unit of a general purpose computer system in a multi-tasking environment under the control of an operating system, comprising:

a multi-position switch electrically coupled to the central processing unit, at least certain positions of the switch being assigned to respective ones of said application programs available for execution within said computer system, wherein said respective application programs are identified within an initialization file within said computer system, wherein said initialization file can be modified and edited by the user;

control program means for causing the central processing unit to periodically sense a current position of the switch;

central processing unit means for determining whether or not said current position is assigned to one of the application programs which is active and running;

means for continuing execution of the currently active and running application program when the sensed current switch position is assigned to the active and running program; and computer system means controlled by the operating system when the sensed current switch position is assigned to one of the application programs other than the active and running application program for rendering said other application program active if it is running and for starting the other application program if it is not already running.

15. The apparatus of claim 14, further comprising:

computer system means effective upon turning the computer system on while the switch is in a position corresponding to a desired one of said application programs for initializing the computer system and starting execution of the desired program independent of user intervention.

16. The apparatus of claim 14, further comprising:

means for programming the switch positions to correspond to respective ones of said application programs in accordance with user requirements.

17. The apparatus of claim 14, wherein one of the positions of the switch is assigned to allow selection of said respective application program by means separate from the switch.

18. A general purpose computer system comprising:

means including a central processing unit (CPU) for concurrent execution of application programs in a multi-tasking environment under the control of an operating system and a graphical user interface program;

a multi-position switch electrically coupled to the CPU;

means including a user defined table for assigning at least certain positions of the switch to respective ones of the application programs available for execution in the computer system, wherein a position of the switch is assigned to allow selection of the application programs by means separate from the switch;

means including the CPU for periodically sensing a current position of the switch and for determining whether or not the current position is assigned to one of the application programs which is active and running;

means for continuing execution of the active and running program when the sensed current position is assigned thereto; and means, effective when the current switch position is assigned to one of the application programs other than the active and running application program, for rendering the other application program active if it is running, and for starting the other application program if it is not already running.

19. The computer system of claim 18, wherein a monitor window is associated with each of the running application programs and wherein the window associated with the active program is on top of the other windows; and wherein means are provided for maximizing the top window to full screen when its associated program becomes active.

20. A computer system comprising:

means including a central processing unit (CPU) for executing programs in a multi-tasking environment;

a manually operable, multi-position switch electrically coupled to the CPU;

means including a user defined table for assigning at least certain positions of the switch to respective ones of the programs;

program controlled means for sensing a change in the position of the switch; and means effective upon sensing said change in the switch position for initiating execution of the program assigned to the changed position.

* * * * *